(12) United States Patent
Kim et al.

(10) Patent No.: US 11,820,322 B1
(45) Date of Patent: Nov. 21, 2023

(54) RESTRAINT SYSTEM

(71) Applicants: Hoonyoung Kim, Franklin Park, IL (US); Hyunsook Kim, Franklin Park, IL (US)

(72) Inventors: Hoonyoung Kim, Franklin Park, IL (US); Hyunsook Kim, Franklin Park, IL (US)

(*) Notice: Subject to any disclaimer, the term of this patent is extended or adjusted under 35 U.S.C. 154(b) by 0 days.

(21) Appl. No.: 17/663,790

(22) Filed: May 17, 2022

(51) Int. Cl.
    *B60R 22/10* (2006.01)

(52) U.S. Cl.
    CPC .................. *B60R 22/105* (2013.01)

(58) Field of Classification Search
    CPC ....... B60R 21/02; B60R 22/00; B60R 22/023; B60R 22/024; B60R 2022/025; B60R 22/03; B60R 22/105; B60R 22/14; B60R 2022/1818; B60R 22/30; B60N 2/265; B60N 2/28; B60N 2/2803; B60N 2/2812; B60N 2002/2818
    See application file for complete search history.

(56) References Cited

U.S. PATENT DOCUMENTS

| | | | |
|---|---|---|---|
| 4,236,755 A | 12/1980 | Pollitt et al. | |
| 4,927,211 A | 5/1990 | Bolcerek | |
| 5,301,371 A | 4/1994 | Chao | |
| 5,379,725 A | 1/1995 | Roberson et al. | |
| 5,468,020 A | 11/1995 | Scime | |
| 6,488,333 B2 | 12/2002 | Kim et al. | |
| 6,729,643 B1 | 5/2004 | Bassick et al. | |
| 6,863,350 B1 | 3/2005 | McCulley et al. | |
| 6,902,193 B2 | 6/2005 | Kim et al. | |
| 7,401,859 B2 | 7/2008 | Kim et al. | |
| 8,696,027 B2 | 4/2014 | Diez Marin et al. | |
| 9,067,561 B2 | 6/2015 | Crews | |
| 10,131,317 B1 * | 11/2018 | Harrington | B60N 2/265 |
| 10,661,749 B2 | 5/2020 | Kim | |
| 2001/0013719 A1 | 8/2001 | Carine et al. | |
| 2003/0001378 A1 | 1/2003 | Kim et al. | |
| 2003/0047972 A1 | 3/2003 | Burleigh et al. | |
| 2004/0169411 A1 | 9/2004 | Murray | |
| 2006/0049929 A1 * | 3/2006 | Lawrence | B60N 2/2887 340/457 |
| 2007/0040441 A1 | 2/2007 | Boyle et al. | |
| 2007/0182235 A1 | 8/2007 | Fonseca De Arruda et al. | |
| 2010/0033000 A1 * | 2/2010 | Singh | B60N 2/757 297/250.1 |
| 2015/0069812 A1 * | 3/2015 | Kim | B60R 22/14 297/465 |
| 2015/0097403 A1 * | 4/2015 | London | B60N 2/2803 297/250.1 |
| 2016/0114760 A1 | 4/2016 | Crawford | |
| 2016/0200288 A1 | 7/2016 | Kim | |
| 2017/0050611 A1 | 2/2017 | Farrugia | |

(Continued)

*Primary Examiner* — Jason D Shanske
*Assistant Examiner* — Daniel M. Keck
(74) *Attorney, Agent, or Firm* — Husch Blackwell LLP

(57) ABSTRACT

An improved restraint system is provided. More particularly, the improved restraint system can include a harness and a booster seat. The harness can be attached to a seat belt of a vehicle. The harness can include a shoulder seat belt guide member for attaching a shoulder seat belt and also a lap seat belt guide member for attaching a lap seat belt. The improved restraint system can allow a child who is otherwise unsuitable for using a booster seat alone to use the booster seat in combination with the harness.

1 Claim, 3 Drawing Sheets

(56) References Cited

U.S. PATENT DOCUMENTS

2018/0184730 A1* 7/2018 Autard .................... A41D 27/04
2019/0315307 A1* 10/2019 Macaluso ............. B60R 22/105
2022/0234540 A1* 7/2022 Barnes ...................... G01L 1/22

* cited by examiner

RESTRAINT SYSTEM

BACKGROUND OF THE INVENTION

Motor vehicle crashes are a leading cause of death and unintentional injuries in the United States. Despite numerious types of safety equipment currently used to prevent crash-related deaths and mitigate crash-related injuries, more than 35,000 people died in vehicle crashes on United States roads in 2015, with an additional 2.4 million people suffering traffic crash-related injuries during the same period.

The safety of automobile occupants generally relies upon the use of seat belts. Seat belts prevent the wearer from being thrown around the interior of a crashing vehicle. They also absorb some of the force that would be otherwise directed against the body of the seat belt wearer. However, seat belts are not always used by vehicle occupants. Many crash-related deaths and injuries are attributed to the failure to use seat belts, particularly among children.

But even if used faithfully, seat belts provide imperfect protection. For example, seat belts spread the force of impact over larger areas of the body but can create accident-related injuries at the locations where they contact the body.

When the seat belt does not fit the wearer properly or is poorly adjusted, the effectiveness of the seat belt decreases. Children are particularly subject to risks posed by incorrectly fitted seat belts. Furthermore, seat belts found in standard automobiles are generally designed for adult-sized occupants. For children in particular, seat belts may not be adjustable to configurations best suited for smaller occupants.

All states now require that children of a certain age or size be placed in child restraint systems to protect small children during motor crashes. However, there remains disagreement as to the most effective design for such restraint systems and surveys show that consumers frequently fail to use the child restraint systems properly, leading to a greater number of injuries to children in automobile crashes. A major problem that underlies failures of seat belts and child restraint systems relates to systems that fit their wearers poorly. Poorly fitting child restraint systems may be ineffective in protecting children from crash-related injuries.

Moreover, all states require children under a certain age or weight are required to be properly restrained when riding in a motor vehicle. Restraints, such as car seats, are typically used for children under 40 pounds. However, car seats can be bulky, and heavy for parents to carry.

In contrast, booster seats are generally smaller in size than a car seat and more convenient for parents to carry. However, booster seats are generally only suitable for children above a weight requirement, such as 40 pounds, making booster seats typically unsuitable for smaller children. Thus, there is a need for a restraint system suitable for younger children that is convenient to transport and to carry.

For restraint systems used with the seat belt systems in vehicles, one size does not fit all. There is a need for a restraint system that can accommodate the changing needs of individual wearers. There is also a different need for a restraint system that can be used for a variety of different individual wearers and in different vehicles with different seat belt systems.

BRIEF SUMMARY OF THE INVENTION

The subject disclosure generally relates to an improved restraint system including a harness, meant to be donned by an individual before entering a vehicle, and secured to the vehicle seat in which the individual sits, in conjunction with a lightweight booster seat.

The same restraint system can be used on more than one individual. The restraint system can be adjusted for a variety of users; it can be loaned, sold, or handed down for use by other users, extending its useful lifetime beyond a single wearer. Also, such restraint systems can be kept by individuals or groups that routinely transport multiple children and need such restraint systems to accommodate a variety of unknown future travelers, such as a taxicab, rideshare, bus, or other transport system. Some individuals may desire such a restraint harness to accommodate visitors or customers who require a safety system while they travel.

A more detailed explanation of the invention is provided in the following description and claims and is illustrated in the accompanying drawings.

Figure 1:
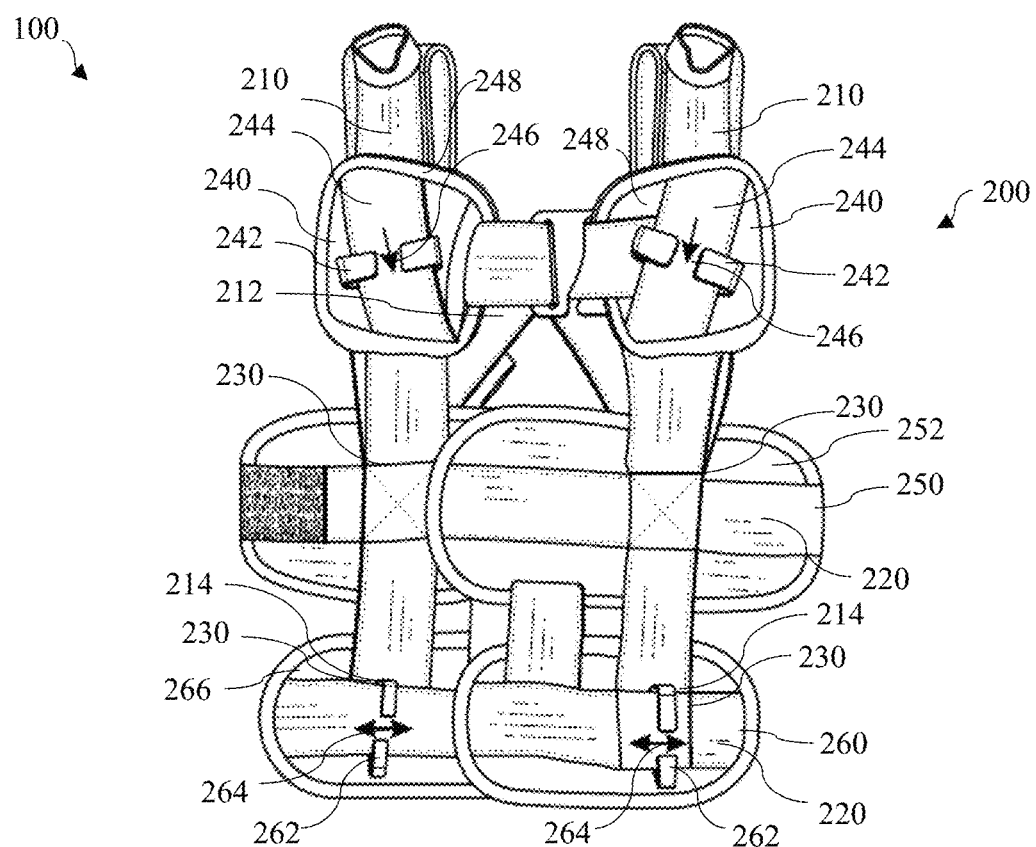
FIG. 1 illustrates a perspective view of an improved restraint system according to an exemplary embodiment.
Figure 1:
Figure 1:
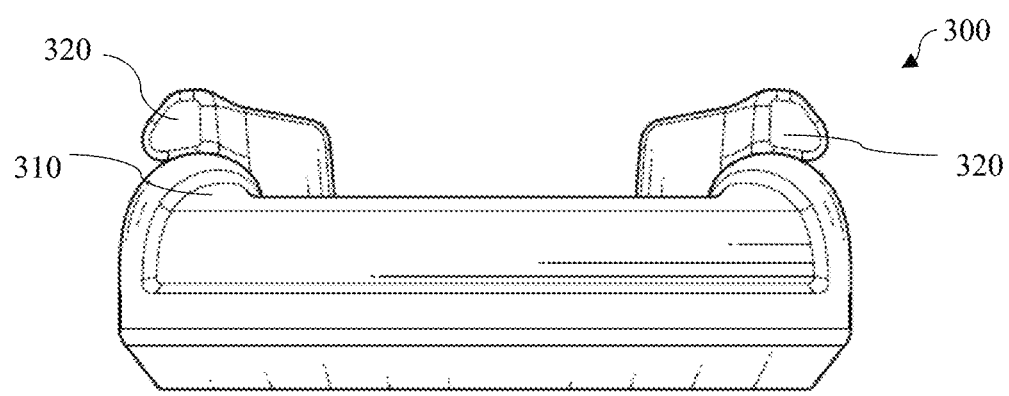

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

Figure 2:
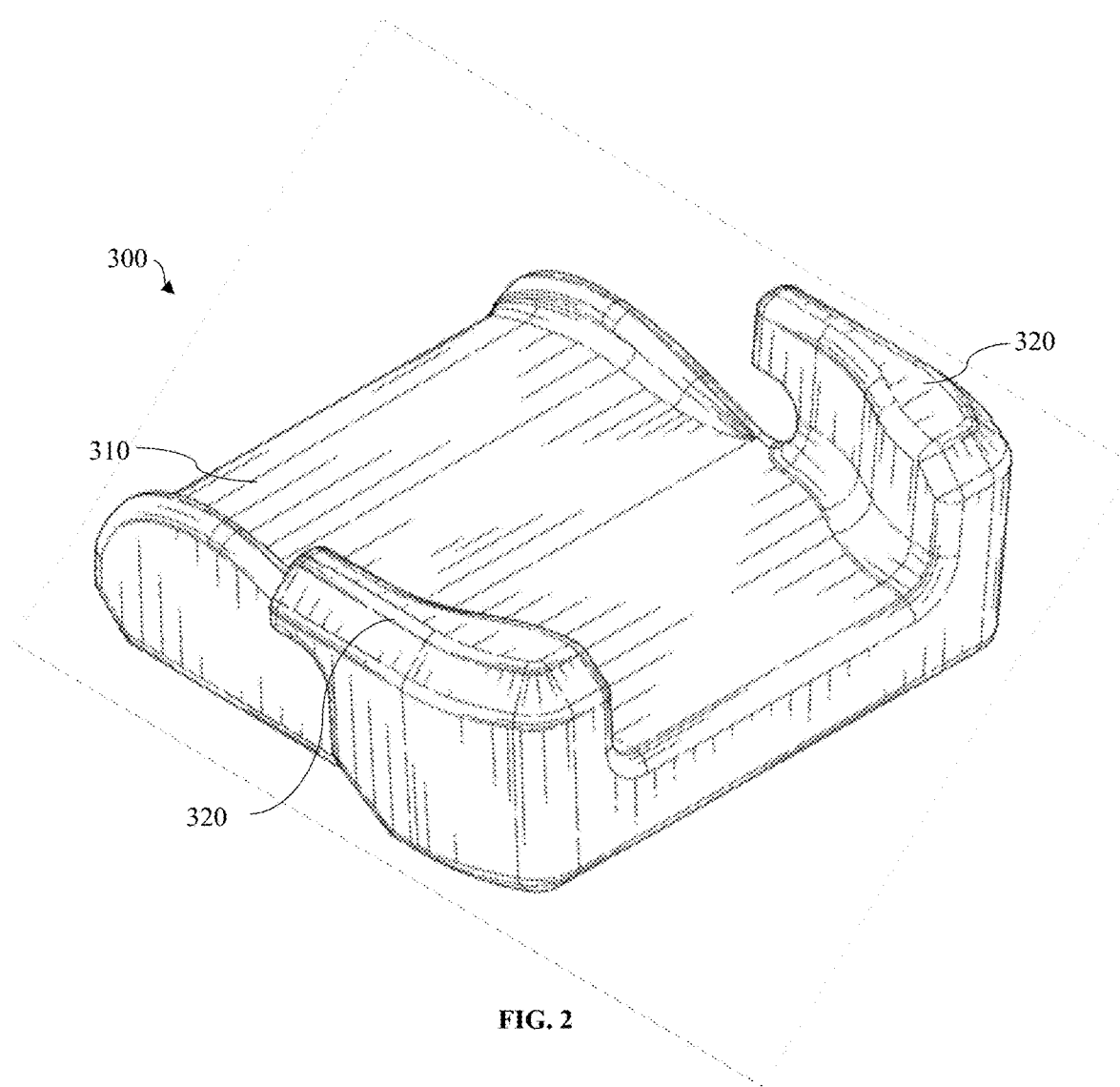
FIG. 2 illustrates a perspective view of a booster seat used in conjunction with the improved restraint system of FIG. 1.
Figure 3:
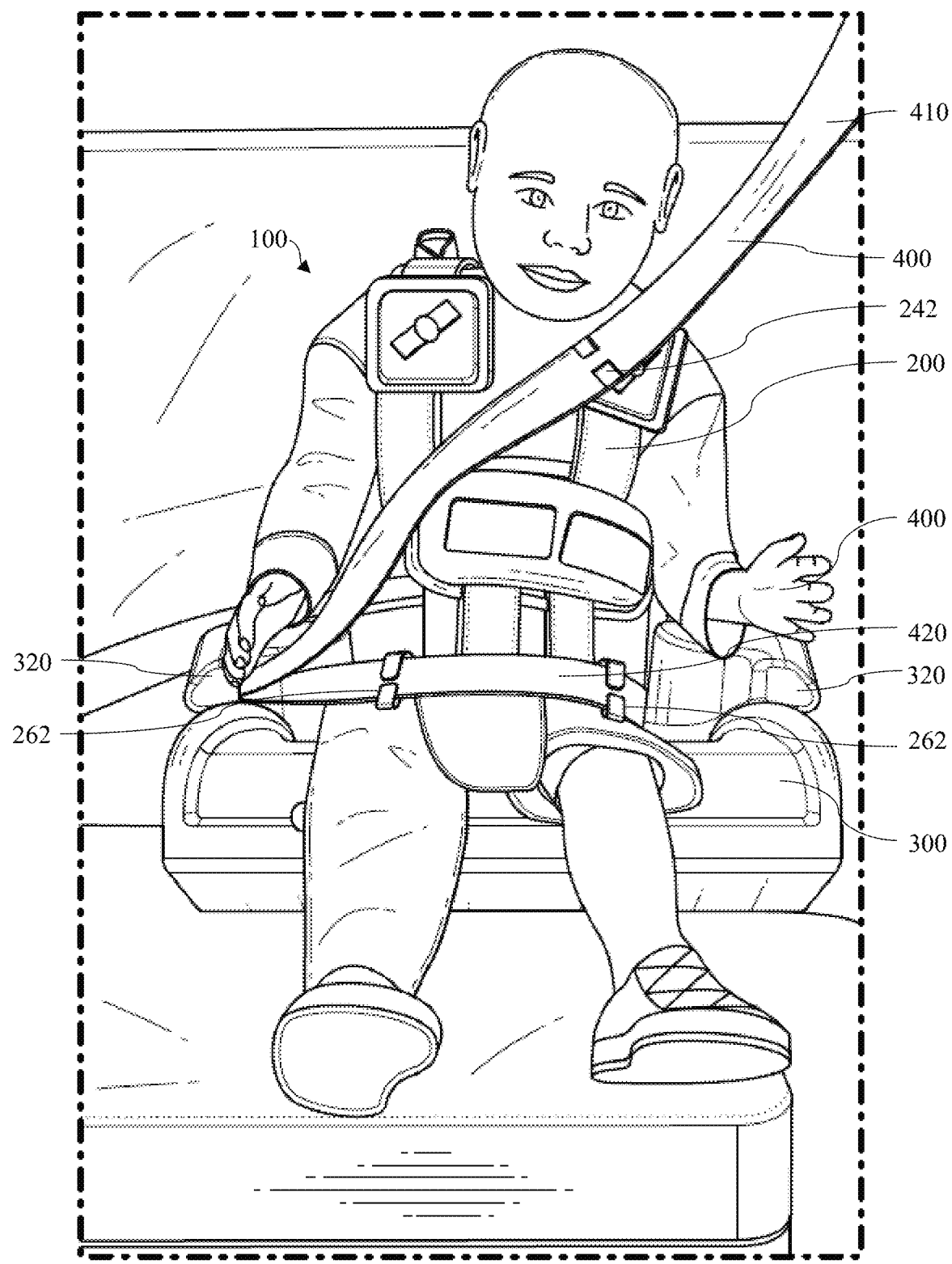
FIG. 3 illustrates an example of using the improved restraint system of FIG. 1.

As shown in FIGS. 1-3, the embodiments of this disclosure include an improved restraint system.

Referring to FIG. 1, an embodiment of the improved restraint system 100 can include a harness 200 and a booster seat 300. The harness 200 can be attached to a seat of a vehicle by securing one or more of the vehicle's seat belts to the harness 200.

The harness 200 can include a number of shoulder straps 210 positioned vertically across the harness 200. In an exemplary embodiment, two shoulder straps 210 can be provided, one to be worn over a user's right shoulder, and another to be worn over the user's left shoulder. The shoulder straps 210 can be of a sufficient length such that they can reach from the front waist height of the user to the rear waist height of the user, passing over the user's shoulders, in a manner similar to that of a pair of suspenders. The length of the shoulder straps 210 can be adjusted to accommodate users of different heights and/or girths.

The shoulder straps 210 can be connected to a number of horizontal straps 220 positioned horizontally across the hardness 200. In an exemplary embodiment, two horizontal straps 220 can be provided, one to be worn over the user's waist (waist strap 250), and another to be worn over the user's laps (laps strap 260). The shoulder straps 210 can be connected to the horizontal straps 220 via one or more fasteners 230, such as by stitching, rivets, adhesives, or the likes.

The shoulder straps 210 and the horizontal straps 220 can be made of the same materials as seat belt straps and can include energy absorbing pads and materials which, along with the restraint provided by the harness, provide security and energy absorption during an automobile crash or other violent movement of a vehicle with occupants. The materials used can be light-weight and durable and are inexpensive to make and produce in desirable shapes and sizes.

In some embodiments, front portions of the shoulder straps 210 can generally be parallel to each other, and rear portions of the shoulder straps 210 can cross over each other such that the rear portions of the shoulder straps 210 form an "X" shape or intersection portion 212. Alternatively different configuration of the shoulder straps 210, such as a "Y" configuration, can be made.

The shoulder straps 210 can include one or more shoulder seat belt securing members 240. The shoulder seat belt securing members 240 can include a shoulder seat belt guide member 242 for guiding a shoulder seat belt of a vehicle into alignment with the shoulder seat belt securing members 240. The shoulder seat belt guide member 242 can include a "C"-shaped structure encircling the positioning strap 244 with an opening 246 facing away from the shoulder strap 210. The positioning strap 244 can slidingly pass through a channel defined by the "C"-shaped shoulder seat belt guide member 242. The shoulder seat belt securing members 240 can further include a shoulder pad 248 facing the user.

The waist strap 250 can be placed in a horizontal orientation relative to the shoulder straps 210, relative to the user in a seated position. The waist strap 250 can be attachable to the shoulder straps 210 such as by stitching, rivets, adhesives, combinations of these or other appropriate manners. The waist strap 250 can include padding 252 joined to an inner and/or outer surface of the waist strap 250. Such padding 252 can protect the user from accidental injury by the waist strap 250 during violent vehicle movement by providing some physical protection of the user's midsection or by dispersing some of the force applied by the waist strap 250 during a collision or other violent movement. The waist strap 250 can be connected to itself in manners known in the art such as through cloth fastening, including but not limited to hook and eye fasteners such as Velcro® fasteners.

The lap strap 260 can extend from a front portions 214 of the shoulder straps 210. The lap strap 260 can secure a vehicle lap seat belt to the harness 200 such that in cases of impact or violent movement, the waist and the soft organs of the midsection of the user are protected against force applied by the attached lap belt.

The lap strap 260 can one or more lap seat belt guide members 262 secured to the lap straps 260. The lap seat belt guide member 262 can include an opening 264 for into which a lap seat belt of the vehicle is inserted or threaded, as well as a channel for receiving the lap seat belt. The lap strap 260 can include padding 266 joined to an inner and/or outer surface of the waist strap 260. Such padding 266 can protect the user from accidental injury by lap strap 260 during violent vehicle movement by providing some physical protection of the user or by dispersing some of the force applied by the lap strap 260 during a collision or other violent movement. The lap strap 260 can be connected to itself in manners known in the art such as through cloth fastening, including but not limited to hook and eye fasteners such as Velcro® fasteners.

Referring to FIG. 2, the booster seat 300 can include a seat surface 310 on a top-side of the booster seat 300 for the user to sit on. The booster seat 300 can include one or more seat belt guides 320. In an embodiment, one seat belt guide 320 can be provided on each side of the booster seat 310. The seat belt guide 320 can include an opening 330 that is generally "C"-shaped or "U"-shaped such that the seat belt of the vehicle can be looped through the seat belt guide 320. The booster seat 300 can be made out of lightweight materials for the ease of transporting. Moreover, the booster seat 300 can be padded to increase user comfort.

Referring to FIG. 3, an exemplary embodiment of using the improved restraint system 100 is shown. In such embodiment, the improved restraint system 100 can be set up for a user 400 to be seated in a vehicle (such as in a backseat of the vehicle). The user 400 can be wearing the harness 200 while sitting on the booster seat 300.

A seat belt for the vehicle can include a shoulder seat belt 410 and a lap seat belt 420. The shoulder seat belt 410 can be secured to the harness 200 through the shoulder seat belt guide member 242. The lap seat belt 420 can be secured to the harness 200 through the lap seat belt guide members 262.

The lap seat belt 420 can also be secured to the booster seat 300 through the seat belt guides 320. Moreover, the shoulder seat belt 410 can also be looped through the seat belt guide 320 of the booster seat 300. In embodiments where two seat belt guides 320 are provided, the lap seat belt 420 can pass through both of the seat belt guides 320, while the shoulder seat belt 410 can pass through just one of the two seat belt guides 320. The seat belt 400 can be fastened to the vehicle through known methods.

Of note, a typical booster seat is generally not recommended for use for a child under a certain weight, such as 40 pounds. However, the improved restraint system 100 can allow an otherwise underweight child to use the booster seat 300 when used in combination with the harness 200.

In laboratory testing, when crash testing a 3-year-old child dummy at about 30 miles per hour (mph) in bench seating, the improved restraint system 100 exhibits superior performance characteristics when compared to using a booster seat alone.

TABLE 1

| Test Metric | Requirement | Booster Only | Booster with Harness |
|---|---|---|---|
| Head Injury Criterion | HIC 1000 less | 847 | 531 |
| Chest Injury Criterion | Chest clip 60G less | 57 | 46 |
| Head Excursion | 720 mm less | 441 | 434 |
| Knee Excursion | 915 mm less | 581 | 515 |

As shown in TABLE 1 above, the improved restraint system 100 allows children as young as three years-old to use the booster seat 200 in combination with the harness 200 and to comply well within with the requirements set forth by the National Highway Traffic Safety Administration (NHTSA) when most conventional booster seats are not suitable for children under four years-old.

In addition, as can be appreciated, the improved restraint system 100 can be significantly lighter than a traditional backward facing or forward facing car seat, making the improved restraint system 100 much more portable and easier to carry for a parent, which can improve usage rate and promote safety of a child.

Specific embodiments of an improved restraint system according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A method of restraining a child in a vehicle, comprising:
   providing a seat belt to a child, the seat belt comprising a shoulder seat belt and a lap seat belt;
   providing a harness to the child, the harness comprising a shoulder strap having a shoulder seat belt guide member and a lap strap having a lap seat belt guide member configured to attach the harness to the seat belt;
   affixing the shoulder seat belt to the shoulder seat belt guide member;
   affixing the lap seat belt to the lap seat belt guide member;
   providing a booster seat to the child, the booster seat having a first seat belt guide and second seat belt guide for receiving the lap seat belt; and
   affixing the lap seat belt to both the harness and booster seat by threading the lap seat belt through the first seat belt guide member on a first side of the child, through the lap seat belt guide member over a front portion of the child, and then through the second seat belt guide member on a second side of the child, thereby attaching the harness and the booster seat to each other and to the seat belt.

* * * * *